UNITED STATES PATENT OFFICE.

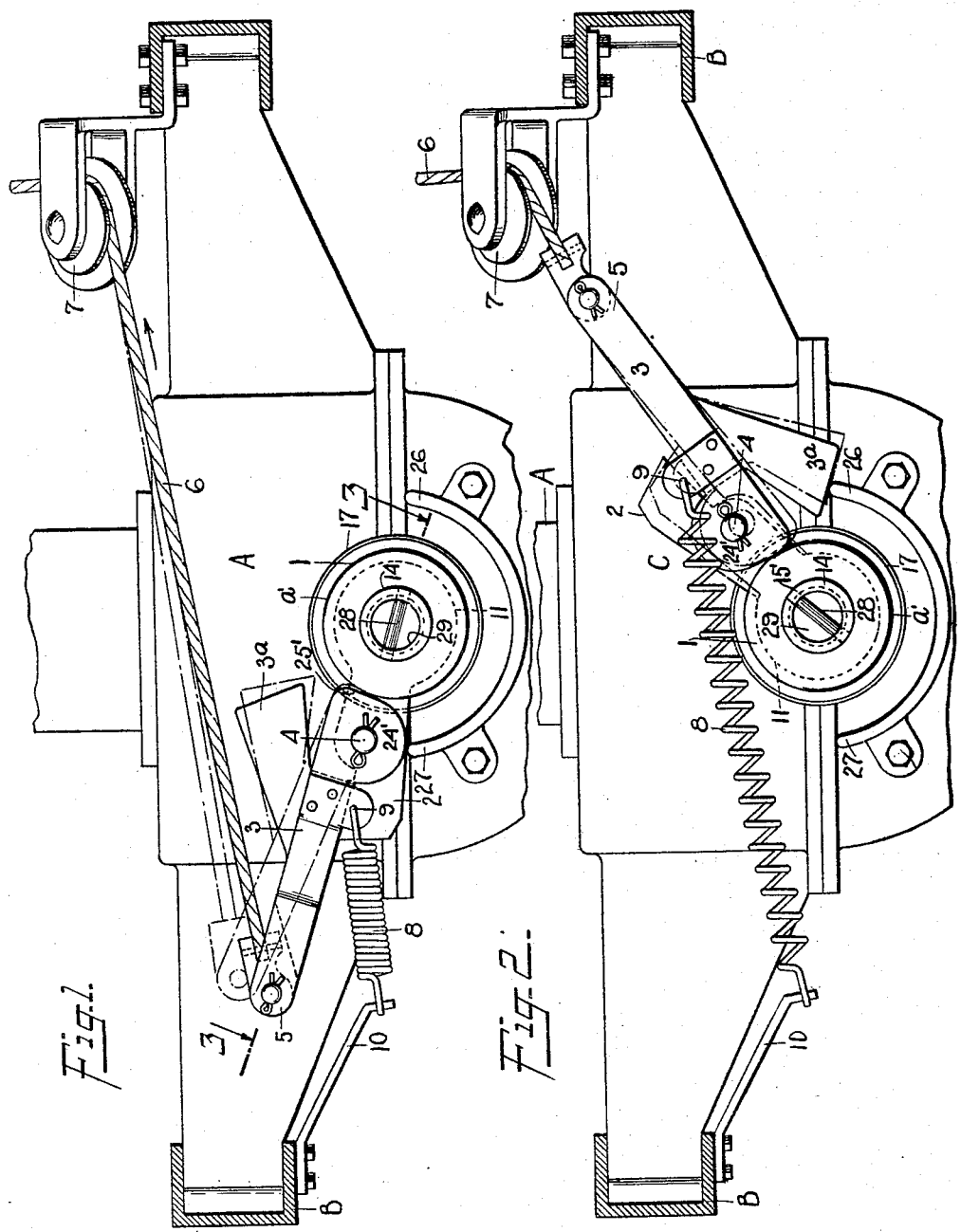

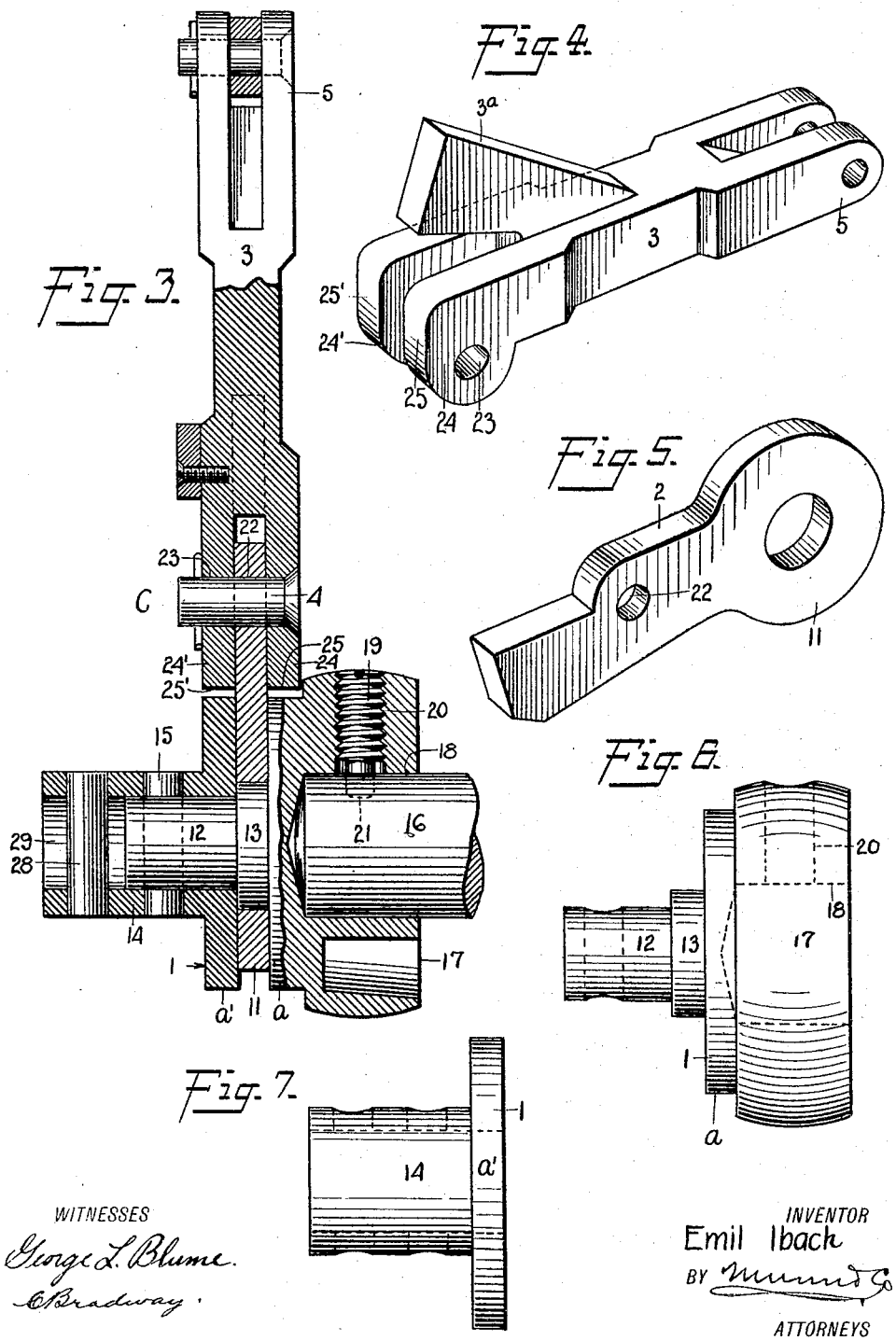

EMIL IBACH, OF BOGOTA, NEW JERSEY, ASSIGNOR OF ONE-HALF TO SAMUEL E. MURRAY, OF NEW YORK, N. Y.

ENGINE-STARTER.

1,198,921.  Specification of Letters Patent.  Patented Sept. 19, 1916.

Application filed November 13, 1914. Serial No. 871,996.

*To all whom it may concern:*

Be it known that I, EMIL IBACH, a citizen of the United States, and a resident of Bogota, in the county of Bergen and State of New Jersey, have invented a new and improved Engine-Starter, of which the following is a full, clear, and exact description.

This invention relates to gas engine starters of the mechanical type and especially designed for use on automobiles, whereby the engine can be started from the driver's seat.

The invention has for its general objects to improve and simplify the construction and operation of mechanisms of the character referred to so as to be reliable and efficient in use, comparatively simple and inexpensive to manufacture and keep in operative condition, and so designed as to be automatically disconnected from the engine shaft as soon as the engine is started, or in case of backfire.

A more specific object of the invention is the provision of an engine starting device which is capable of attachment to the starting crank end of an engine, whereby the engine can be started from the driver's seat, the starting device including a clutch wheel connected with the engine shaft, and a clutch lever so mounted with respect to the said wheel that it can be thrown into clutching engagement therewith for the purpose of starting the engine and which will be automatically disengaged from the clutch wheel when the engine is started, or in case of backfire of the engine, the said lever being operated in one direction by suitable means conveniently within reach of the driver and moved in the opposite direction by a return spring or equivalent means.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views Figure 1 is a front view of an engine starter applied to an engine and showing the parts in normal position; Fig. 2 is a similar view showing the engine starter at the end of the starting operation; Fig. 3 is an enlarged sectional view on the line 3—3, Fig. 1; Fig. 4 is a perspective view of the clutch lever; Fig. 5 is a perspective view of the clutch lever carrying arm; Fig. 6 is a side view of one part of the clutch wheel and its attaching means; and Fig. 7 is the other part of the clutch wheel.

Referring to the drawing, A designates an explosive engine suitably mounted on an automobile frame B, and C is the engine starting mechanism. This starting mechanism comprises a clutch wheel 1 suitably fastened to the engine shaft, an arm 2 which is free to swing about the axis of the wheel 1 as a center, a clutch lever 3 pivoted at 4 on the arm 2 and coöperating with the wheel 1 to grip the same and cause the shaft of the engine to turn as the clutch lever is actuated, and connected with the outer end 5 of the clutch lever is a pull cable or equivalent element 6 which passes around a suitably-arranged guide pulley 7 and terminates at a point where it can be conveniently actuated by the driver, the cable 6 serving to move the clutch lever in a direction to start the engine, while the return movement of the clutch lever is effected by a spring 8 having one end fastened at 9 to the lever and the other end secured to a stationary anchor 10.

As shown in Figs. 3, 6 and 7, the clutch wheel 1 is composed of two circular parts $a$ and $a'$ which are spaced to receive between them the hub 11 of the arm 2, and on the part $a$ is a central stud 12 which has an enlarged portion 13 that forms a bearing or axle for the hub 11 of the lever-carrying arm 2. The stud 12 enters a tubular extension 14 of the section $a'$ of the clutch wheel, and the two parts are secured together by a pin 15. The section $a$ is provided with suitble means for attachment with the engine shaft 16, Fig. 3, such means being a socketed body or attaching base 17 into the socket 18 of which the engine shaft 16 extends, and this attaching base is secured to the engine shaft by a screw 19 threaded in an opening 20 in the attaching base and entering a socket 21 in the shaft 16. The arm 2 projects outwardly from between the two sections $a$ and $a'$ of the clutch wheel 1, and the pivot 4 that connects the clutch lever 3 with the arm 2 passes through an opening 22 in the arm and through openings 23 in the bifurcations 24 and 24' of the clutch lever. The bifurcations 24, 24' are disposed respectively in the same plane with the sections a and a' of the clutch wheel, and the bifurcations are formed with tangential clutch surfaces 25 and 25' which are adapted to frictionally engage the peripheral surfaces of the sections a and a' when the clutch lever is operated to start the engine.

When the engine is running or is idle the clutch lever 3 is in the full-line position. Fig. 1, and it will be noted that the clutch lever is wholly disengaged from the clutch wheel, so that there is no interference with the free rotation of the engine shaft when the engine is running. When it is desired to start an idle engine the driver of the car pulls on the cable 6 in a direction indicated by the arrow, and the first effect is that the clutch lever 3 will be moved from the full to the broken-line position, Fig. 1, whereby the clutch surfaces 25 and 25' will engage the sections a and a' of the clutch wheel, and as the pull on the cable continues the clutch lever 3, arm 2 and clutch wheel 1 will turn in a clockwise direction, Fig. 1, until a point is reached when explosion will take place. When the engine is thus started the clutch lever is automatically released from the clutch wheel by a member 3ª on the clutch lever engaging a fixed stop 26 which causes the clutch lever to tilt on its pivot 4, and thereby release the clutch wheel 1. The spring 8 which has been placed under tension or stretched by the movement of the clutch lever to the right, will now operate to restore the parts from the position shown in Fig. 2 to that shown in Fig. 1.

Should the engine backfire while it is being started the clutch lever is automatically released by reason of the latter striking a fixed stop 27, which stop is so arranged that it strikes the arm 2 adjacent the pivot 4, and consequently the outer end of the lever 3 will tend to continue to travel by reason of the momentum which the lever has, due to the backfiring. In other words, the outer end of the lever tends to move downwardly in Fig. 1, when the inner end is arrested, and this movement disengages the gripping surfaces 25 and 25' of the clutch lever from the clutch wheel, so that the latter continues to rotate reversely until the force of the backfiring has been spent. The stops 26 and 27 are arranged approximately one hundred and eighty degrees apart so that the clutch lever is limited to a swing of less than this arc. In actual practice a swing of about ninety degrees is all that is necessary to start the engine.

In order to be able to start the engine by hand in case the starter becomes inoperative the tubular extension 14 of the clutch wheel has a diametrically disposed pin 28 extending across the socket 29 of the tubular extension 14, and a starting crank is adapted to be entered in the socket 29 and engaged with the pin 28, so that power can be transmitted to the engine shaft for starting the engine.

From the foregoing description taken in connection with the accompanying drawings, the advantages of the construction and method of operation will be readily understood by those skilled in the art to which the invention appertains, and while I have described the principle of operation, together with the mechanism which I now consider to be the best embodiment thereof, I desire to have it understood that the mechanism shown is merely illustrative and that such changes may be made when desired as are within the scope of the appended claims.

Having thus described my invention I claim as new and desire to secure by Letters Patent:

1. An engine starter comprising an element having at one side a socket to receive the end of the engine shaft and provided with a stud extending axially from the opposite side and formed with a circular portion at the base of the stud, a tubular element fitted on the stud and having a circular portion of substantially the same diameter as the circular portion of the first element, pins extending across the tubular element, one pin extending through the stud for locking the tubular element thereon, and the other pin being disposed outwardly beyond the end of the stud for engagement with a starting crank handle, an arm loosely mounted on the stud and held between the elements, and a clutch lever pivoted on the arm and adapted to engage the circular portions of the two elements for causing the latter to turn with the lever in starting the engine.

2. A starter for engines, comprising an element adapted to be coupled to the shaft of the engine and having a circular surface, an arm pivotally mounted on the element, a lever fulcrumed on the arm and adapted to engage the circular surface, means for moving the lever into clutching engagement with the circular surface and causing the said element to turn for starting the engine, a yielding means connected with the lever for disengaging the same from the circular surface and restoring the lever and arm to normal position, and a stop device adapted to be fastened to the engine and having portions disposed at approximately diametrically opposite points with respect to the shaft to be struck by the lever when the latter is moving on its starting motion, and also to be struck by the lever when the latter is thrown backwardly by the backfiring to thereby release the lever from the said surface.

3. An engine starter comprising an engine shaft, a clutch wheel fastened thereto, an element mounted to swing about the axis of the wheel, and said element consisting of two hingedly connected parts, one part having means for engaging the periphery of the clutch wheel to move the latter with the element, means for moving the element in a direction to turn the clutch wheel, means for moving the element in the opposite direction, a stop with which the element engages for effecting the release of the latter from the clutch wheel when the engine starts, and a stop with which the element engages to effect the release of the latter from the clutch wheel when the engine backfires.

4. An engine starter comprising an engine shaft, a socketed attaching device secured to the shaft, a circular clutch surface carried by the said device, an axially extending stud on the said device, a swinging member loosely mounted on the stud, a member rigidly secured to the stud and having a circular clutch surface, a lever fulcrumed on the outer part of the swinging member and having surfaces for engaging the said clutch surfaces, means connected with the lever for causing the same to grip the said circular surfaces to turn the engine shaft in one direction, a spring connected with the lever for returning the same to initial position, and stop means for disengaging the lever from the said surfaces when the engine shaft turns in either direction by explosion.

In testimony whereof I have signed my name to this specification in the presence of two subscribing witnesses.

EMIL IBACH.

Witnesses:
  JOHN STORY,
  CARL H. KRIEG.